(12) United States Patent
Meise et al.

(10) Patent No.: US 8,920,930 B2
(45) Date of Patent: *Dec. 30, 2014

(54) FILM LAMINATES HAVING DAMPING PROPERTIES CONTAINING A SUB-LAYER MADE OF PLASTICIZER-CONTAINING POLYVINYL (ISO)ACETAL

(75) Inventors: Markus Meise, Mannheim (DE); Jan Beekhuizen, Troisdorf (DE); Martin Steuer, Liederbach (DE); Uwe Keller, Bonn (DE); Michael Frank, Nieder-Olm (DE)

(73) Assignee: Kuraray Europe GmbH, Hattersheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,680

(22) Filed: Jul. 19, 2012

(65) Prior Publication Data
US 2013/0189527 A1 Jul. 25, 2013

(30) Foreign Application Priority Data
Jul. 22, 2011 (EP) .................................. 11175084

(51) Int. Cl.
*B32B 17/10* (2006.01)
*B32B 27/30* (2006.01)

(52) U.S. Cl.
CPC ..... *B32B 17/10761* (2013.01); *B32B 17/10036* (2013.01); *B32B 27/306* (2013.01); *B32B 2250/03* (2013.01); *B32B 2250/246* (2013.01)
USPC ........... 428/437; 428/436; 428/441; 428/501; 428/515; 428/524; 428/525

(58) Field of Classification Search
None
See application file for complete search history.

(56) References Cited

U.S. PATENT DOCUMENTS

| | | | | |
|---|---|---|---|---|
| 2,229,781 A * | 1/1941 | Weihe et al. | .................. | 428/437 |
| 2,328,646 A * | 9/1943 | Izard | .............................. | 524/306 |
| 5,190,826 A * | 3/1993 | Asahina et al. | ............... | 428/437 |
| 5,340,654 A | 8/1994 | Ueda et al. | | |
| 5,478,615 A | 12/1995 | Rehfeld et al. | | |
| 6,801,652 B1 | 10/2004 | Stanzl et al. | | |
| 7,528,192 B2 * | 5/2009 | Papenfuhs et al. | .............. | 525/61 |
| 2005/0239960 A1 | 10/2005 | Papenfuhs et al. | | |
| 2006/0210782 A1 | 9/2006 | Lu | | |
| 2007/0014976 A1 | 1/2007 | Matsudo | | |
| 2010/0028642 A1 * | 2/2010 | Steuer et al. | .................. | 428/220 |
| 2012/0162752 A1 | 6/2012 | Kitano et al. | | |
| 2012/0244329 A1 | 9/2012 | Iwamoto et al. | | |

FOREIGN PATENT DOCUMENTS

| | | |
|---|---|---|
| EP | 0185863 B1 | 7/1986 |
| EP | 0 185 863 B1 | 5/1989 |
| EP | 0 387 148 B1 | 8/1993 |
| EP | 0387148 B1 | 8/1993 |
| EP | 1 118 258 B1 | 7/2001 |
| EP | 1 118 258 B1 | 3/2003 |
| EP | 1 527 107 B1 | 5/2005 |
| EP | 1 606 325 | 12/2005 |
| EP | 1 527 107 B1 | 6/2007 |
| EP | 1 606 325 | 3/2008 |
| JP | 2011-42552 A | 3/2011 |
| JP | 201142552 A | 3/2011 |
| WO | 02/102591 A1 | 12/2002 |
| WO | 03/020776 A1 | 3/2003 |
| WO | 2004/063231 A1 | 7/2004 |
| WO | 2004063232 A1 | 7/2004 |
| WO | 2006/102049 A2 | 9/2006 |
| WO | 2006102049 A2 | 9/2006 |
| WO | 2008/137367 A2 | 11/2008 |
| WO | 2011/024788 A1 | 3/2011 |
| WO | 2011024788 A1 | 3/2011 |
| WO | 2011/078314 A1 | 6/2011 |
| WO | 2011078314 A1 | 6/2011 |
| WO | 2011/081190 A1 | 7/2011 |
| WO | 2011081190 A1 | 7/2011 |

* cited by examiner

*Primary Examiner* — Callie Shosho
*Assistant Examiner* — Daniel D Lowrey
(74) *Attorney, Agent, or Firm* — Brooks Kushman P.C.

(57) ABSTRACT

Film laminates are formed from at least three layers A, B and C, each containing at least one plasticizer and at least one polyvinyl acetal, wherein two outer layers A and C each contain at least one identical or different polyvinyl acetal having a proportion of polyvinyl alcohol groups of 18.5 to 23% by weight, at least one inner layer B contains a polyvinyl acetal having a proportion of polyvinyl alcohol groups of 12 to 18% by weight, and at least one of the layers A, B or C contains at least one polyvinyl (iso)acetal. The film laminates can be used for the production of glass/film laminate/glass composites for motor vehicles, aircraft, ships, architectural glazings, façade components, or for the production of photovoltaic modules.

15 Claims, No Drawings

FILM LAMINATES HAVING DAMPING PROPERTIES CONTAINING A SUB-LAYER MADE OF PLASTICIZER-CONTAINING POLYVINYL (ISO)ACETAL

CROSS-REFERENCE TO RELATED APPLICATIONS

This application claims priority to European Patent Application No. 11175084.0 filed Jul. 22, 2011 which is herein incorporated by reference.

BACKGROUND OF THE INVENTION

1. Field of the Invention

The invention relates to a film laminate, suitable, for example, as an intermediate layer in laminated safety glazings, the film laminate being formed from at least three layers based on plasticizer-containing polyvinyl (n)acetals and/or polyvinyl (iso)acetals and having good damping properties for sound.

2. Background Art

The invention relates to a film laminate, suitable, for example, as an intermediate layer in laminated safety glazings, the film laminate being formed from at least three layers based on plasticizer-containing polyvinyl (n)acetals and/or polyvinyl (iso)acetals and having good sound damping properties.

Laminate safety glazings generally consist of two glass panes and an intermediate film connecting the glass panes. Plasticizer-containing polyvinyl butyral (PVB) is predominantly used as film material and is obtainable by reacting polyvinyl alcohol with n-butyraldehyde.

An increasingly important feature of safety glazings is the sound damping properties thereof, which can be adjusted by corresponding intermediate-layer films. To this end, intermediate films having two to five sub-layers are often used, wherein the sub-layers differ in terms of their mechanical strengths and soundproofing is thus achieved by mechanical decoupling.

Different mechanical strengths of films based on plasticizer-containing polyvinyl acetal can be set, for example, by the plasticizer content of said films or the proportion of polyvinyl alcohol groups or polyvinyl acetate groups in the polyvinyl acetal used. Generally, the mechanical strength of PVB films can be adjusted by the plasticizer content thereof or by the proportion of polyvinyl alcohol groups or polyvinyl acetate groups in the polyvinyl acetal used. For example, U.S. Pat. No. 5,340,654 or WO 2006/102049 describe multi-layer systems in which a first layer contains a polyvinyl butyral having a high residual acetate content and a second layer contains a polyvinyl butyral having a low residual acetate content. Similarly, WO 2008/137367 describes multi-layer systems in which the sub-layers made of polyvinyl butyral differ in terms of their polyvinyl alcohol content.

Due to the different residual acetate contents and different proportions of polyvinyl alcohol groups, the sub-layers have a different plasticizer content and therefore different mechanical strengths. Mechanical decoupling and therefore improved soundproofing are thus achieved.

The known multi-layer films are based on polyvinyl butyral, which is obtainable by reacting polyvinyl alcohol with n-butyraldehyde. Different plasticizer contents of the layers are obtained with use of polyvinyl(n)butyrals having different polyvinyl alcohol or polyvinyl acetate contents. This results in different mechanical properties of the layers, the greater these differences become, the greater is the soundproofing of the laminate. Good soundproofing generally results in poor mechanical properties. In addition, the layers are incompatible, that is to say there is hardly any mechanical bonding therebetween, and can slide against one another. Incompatible layers can no longer be mixed with one another, and therefore these film laminates can only be recycled poorly into the process.

SUMMARY OF THE INVENTION

An object of the present invention was therefore to produce film laminates having soundproofing properties, these films having high plasticizer compatibility due to the selection of the plasticizer-containing polyvinyl acetals used and therefore exhibiting good soundproofing. It has surprisingly been found that film laminates which contain at least one layer based on polyvinyl (iso)acetal have good plasticizer compatibility and good damping properties due to different mechanical strengths.

DETAILED DESCRIPTION OF THE PREFERRED EMBODIMENT(S)

Film laminates without use of polyvinyl (iso)acetal are known for example from WO 2006/102049 A1, WO 2011/078314 A1, WO 2011/081190 A1, US 2007014976, WO 2011/024788 A1 and JP 2011042552. The advantageous properties of polyvinyl (iso)acetal are not described herein.

The present invention therefore relates to film laminates formed from at least three layers A, B and C, each containing at least one plasticizer and at least one polyvinyl acetal, wherein the two outer layers A and C each contain at least one identical or different polyvinyl acetal having a proportion of polyvinyl alcohol groups of 18.5 to 23% by weight at least one inner layer B contains a polyvinyl acetal having a proportion of polyvinyl alcohol groups of 12 to 18% by weight, and at least one of the layers A, B or C contains at least one polyvinyl (iso)acetal.

The film laminates according to the invention preferably contains at least one, in particular two, layers, containing at least one polyvinyl (n)acetal. Accordingly, the film laminate according to the invention may have at least one, in particular two, layers, containing at least one polyvinyl (iso)acetal. In this variant of the invention, the film laminate can be formed in such a way that both outer layers A and C each contain at least one identical or different polyvinyl (iso)acetal and the inner layer B contains at least one polyvinyl (n)acetal. Alternatively, the two outer layers A and C may each contain at least one identical or different polyvinyl (n)acetal and the inner layer B may contain at least one polyvinyl (iso)acetal.

In a further embodiment of the invention, the film laminate according to the invention may be formed merely from layers A, B and C containing at least one polyvinyl (iso)acetal, that is to say the two outer layers A and C each contain at least one identical or different polyvinyl (iso)acetal and the inner layer B contains a polyvinyl (iso)acetal different at least from the layers A and C.

The soundproofing effect of the film laminate according to the invention was determined on the basis of the damping properties according to ISO 16940:2008 on a test specimen formed from an intermediate-layer film 0.8 mm thick, laminated between two glass panes 2 mm thick. The first mode was determined in each case.

The soundproofing effect of the laminate films according to the invention should be greatest at the use temperatures of the subsequent glass laminate. In automotive glazings, the use temperatures lie approximately at 20° C., since the pane is heated in the winter and cooled by air-conditioning systems in the summer. In the aforementioned measurement arrangement, films according to the invention exhibit maximum damping, in this case in particular damping values of more than 19%, preferably of more than 20% and more preferably of more than 23%, preferably in a temperature range of 17.5 to 22.5° C.

The layers used in accordance with the invention contain polyvinyl acetals, which are obtained by acetalisation of polyvinyl alcohols, in each case with "n-" (that is to say linear compounds) or "iso-" aldehydes or keto compounds (that is to say branched compounds).

The polyvinyl (iso)acetals used in accordance with the invention are preferably obtained by reacting at least one polyvinyl alcohol with one or more aliphatic keto compounds containing 4 to 10 carbon atoms and having at least one branch at the position alpha or beta to the keto group. The aliphatic keto compounds used to produce polyvinyl (iso) acetals can be the same or different in different layers. The aliphatic keto compounds for producing the polyvinyl (iso) acetals are preferably identical in different layers; the polyvinyl (iso)acetals in different layers are more preferably chemically identical, that is to say they have the same proportions of polyvinyl alcohol groups and polyvinyl acetate groups and the same degree of polymerisation. In particular, iso-butyraldehyde is used for production of the polyvinyl (iso)acetals.

When producing the polyvinyl (iso)acetals used in accordance with the invention, it is also possible, besides the described branched keto compounds, to additionally use one or more unbranched aliphatic keto compounds containing 2 to 10 carbon atoms for acetalisation. A mixture of n-butyraldehyde and/or acetaldehyde with iso-butyraldehyde is preferably used. The proportion of acetal groups in the polyvinyl (iso)acetal resulting from branched keto compounds should be more than 60 mol %, preferably more than 80 mol %, of the sum of branched and unbranched acetal groups.

The polyvinyl (n)acetal used in accordance with the invention results in particular from the reaction of at least one polyvinyl alcohol with one or more aliphatic unbranched keto compounds containing 2 to 10 carbon atoms. For this purpose, n-butyraldehyde is preferably used.

When producing the polyvinyl (n)acetals used in accordance with the invention, it is also possible, besides the described unbranched keto compounds, to additionally use one or more branched aliphatic keto compounds containing 4 to 10 carbon atoms for acetalisation. A mixture of n-butyraldehyde and/or acetaldehyde with iso-butyraldehyde is preferably used. The proportion of acetal groups in the polyvinyl (n)acetal resulting from unbranched keto compounds should be more than 60 mol %, preferably more than 80 mol %, of the sum of branched and unbranched acetal groups.

The polyvinyl alcohols in different layers used to produce the polyvinyl acetals (polyvinyl (iso)acetal and polyvinyl (n)acetal) can be the same or different, in pure form or in the form of a mixture of polyvinyl alcohols having a different degree of polymerisation or degree of hydrolysis.

The polyvinyl acetate content of the polyvinyl acetals (polyvinyl (iso)acetal and polyvinyl (n)acetal) in different layers can be adjusted by use of a polyvinyl alcohol hydrolysed to a corresponding proportion. The polarity of the polyvinyl acetal is influenced by the polyvinyl acetate content, whereby the plasticizer compatibility and the mechanical strength of the respective sub-film also change. It is also possible to carry out the acetalisation of the polyvinyl alcohols using a mixture of a plurality of aldehydes or keto compounds.

The layers preferably contain polyvinyl (iso)acetals and/or polyvinyl (n)acetals having a proportion of polyvinyl acetate groups, based on the layers, of 0.1 to 15% by weight, more preferably 0.1 to 8% by weight, and in particular 0.1 to 3% by weight, these being the same or different in each case. A proportion of polyvinyl acetate groups of 0.1 to 2% by weight is most preferred.

The layers A and C preferably contain polyvinyl (iso) acetals and/or polyvinyl (n)acetals having a proportion of polyvinyl alcohol groups based on the layers of 19.0 to 21% by weight, these being the same or different in each case. The layers B preferably contain polyvinyl (iso)acetals and/or polyvinyl (n)acetals having a proportion of polyvinyl alcohol groups based on the layers of 14.0 to 16.0% by weight or of 16.1 to 18% by weight.

The layers preferably contain uncrosslinked polyvinyl (iso)acetal and/or polyvinyl (n)acetal. The use of crosslinked polyvinyl (iso)acetals and/or crosslinked polyvinyl (n)acetals is also possible. Methods for crosslinking polyvinyl acetals are described for example in EP 1527107 B1 and WO 2004/063231 A1 (thermal self-crosslinking of polyvinyl acetals containing carboxyl groups), EP 1606325 A1 (polyvinyl acetals crosslinked with polyaldehydes) and WO 03/020776 A1 (polyvinyl acetals crosslinked with glyoxylic acid).

The use of crosslinked polyvinyl (iso)acetals and/or crosslinked polyvinyl (n)acetals in the inner layer B is particularly preferred. In this case in particular crosslinked polyvinyl (iso)acetals and/or crosslinked polyvinyl (n)acetals are used which have a solution viscosity increased by 25 to 200% compared to the respective uncrosslinked material. For example, the uncrosslinked material may thus have a solution viscosity of 80 mPas and the crosslinked material may have a solution viscosity of 100 to 250 mPas. The co-acetalisation of polyvinyl alcohols with a mixture of the aforementioned keto compounds and dialdehydes or trialdehydes, such as glutardialdehyde, according to WO 03/020776 A1 lends itself to the production of crosslinked polyvinyl (iso)acetals and polyvinyl (n)acetals.

The polyvinylacetals (polyvinyl (iso)acetals and polyvinyl (n)acetals) used in the layers A, B and C may have the same or different mean degree of polymerisation of less than 3000, preferably between 200 and 2800. Most preferably, the polyvinylacetals (polyvinyl (iso)acetals and polyvinyl (n)acetals) used in the layers A, B and C have a mean degree of polymerisation between 900 and 2500.

Generally, the compatibility between plasticizer and polyvinyl acetals decreases with a drop in the polar nature of the plasticizer. Plasticizers of relatively high polarity are therefore more compatible with polyvinyl acetal than those of relatively low polarity. Alternatively, the compatibility of plasticizers of low polarity increases with a rise in the degree of acetalisation, that is to say with a drop in the number of hydroxyl groups and therefore in the polarity, of the polyvinyl acetal.

Due to the different polyvinyl acetal groups (n and iso) of the layers, the layers may absorb different amounts of plasticizers with the same number of polyvinyl alcohol groups, without exudation or migration of the plasticizer. Different amounts of plasticizer also result in different mechanical properties of the layers, and therefore the mechanical properties of the layers and therefore of the film laminate can be adjusted via the selection of the plasticizer and/or of the polyvinyl alcohol content of the polyvinyl acetals used.

The layers may each contain the same or different plasticizers (first, second or third). The use of chemically identical plasticizers in all layers is preferred.

The layers may contain plasticizers or plasticizer mixtures from at least one of the following plasticizers known for PVB films:

- esters of polyvalent aliphatic or aromatic acids, for example dialkyl adipates such as dihexyl adipate, dioctyl adipate, hexylcyclohexyl adipate, mixtures of heptyl adipates and nonyl adipates, diisononyl adipate, heptylnonyl adipate, and esters of adipic acid with cycloaliphatic ester alcohols or ester alcohols containing ether bonds, dialkyl sebacates such as dibutyl sebacate, and esters of sebacic acid with cycloaliphatic ester alcohols or ester alcohols containing ether bonds, esters of phthalic acid such as butylbenzyl phthalate or bis-2-butoxyethyl phthalate, esters of cyclohexane dicarboxylic acid such as 1,2-cyclohexane dicarboxylic acid diisononyl ester;
- esters or ethers of polyvalent aliphatic or aromatic alcohols or oligoether glycols with one or more unbranched or branched aliphatic or aromatic substituents, such as esters of diglycols, triglycols or tetraglycols with linear or branched aliphatic or cycloaliphatic carboxylic acids; examples of this last group include diethylene glycol-bis-(2-ethylhexanoate), triethylene glycol-bis-(2-ethylhexanoate), triethylene glycol-bis-(2-ethylbutanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate;
- phosphates with aliphatic or aromatic ester alcohols, such as tris(2-ethylhexyl) phosphate (TOF), triethyl phosphate, diphenyl-2-ethylhexyl phosphate, and/or tricresyl phosphate;
- esters of citric acid, succinic acid, and/or fumaric acid.

One or more of the following plasticizers is/are particularly preferred: di-2-ethylhexyl sebacate (DOS), di-2-ethylhexyl adipate (DOA), dihexyl adipate (DHA), dibutyl sebacate (DBS), triethylene glycol-bis-n heptanoate (3G7), tetraethylene glycol-bis-n-heptanoate (4G7), triethylene glycol-bis-2-ethyl hexanoate (3GO or 3G8), tetraethylene glycol-bis-n-2-ethyl hexanoate (4GO or 4G8), di-2-butoxyethyl adipate (DBEA), di-2-butoxyethoxyethyl adipate (DBEEA), di-2-butoxyethyl sebacate (DBES), di-2-ethylhexyl phthalate (DOP), di-isononyl phthalate (DINP), triethylene glycol-bis-isononanoate, triethylene glycol-bis-2-propyl hexanoate, 1,2-cyclohexane dicarboxylic acid diisononyl ester (DINCH), tris(2-ethylhexyl) phosphate (TOF) and dipropylene glycol benzoate.

In addition, the layers may contain further additives, such as residual amounts of water, UV absorbers, antioxidants, adhesion regulators, optical brighteners, stabilisers, dyes, processing aids, organic or inorganic nanoparticles, pyrogenic silicic acid, and/or surface-active substances.

In a variant of the invention, all layers contain the aforementioned additives largely in the same concentration. In a specific variant of the invention, at least one of the layers does not contain any adhesion regulators (anti-stick agents). Within the scope of the present invention, anti-stick agents are understood to means compounds with which the adhesion of plasticizer-containing polyvinyl acetal films to glass surfaces can be adjusted. Compounds of this type are known to a person skilled in the art; alkaline or alkaline earth metal salts of organic acids, such as potassium/magnesium acetate, are often used in practice for this purpose.

To improve rigidity, it is also possible for at least one of the layers to contain 0.001 to 20% by weight $SiO_2$, preferably 1 to 15% by weight, in particular 5 to 10% by weight, optionally doped with $Al_2O_3$ or $ZrO_2$.

The layers within the film laminate can be used practically at any thickness, provided the soundproofing properties are not modified in a detrimental manner. All layers may thus have the same thickness, although combinations of layers of different thickness are also possible. In the preferred arrangement of the film laminate according to the invention as a triple composite, the outer layers A and C largely have the same thickness, whilst the soundproofing layer B can be as thin as possible. The soundproofing layer B may thus have a thickness of 0.05 to 0.20 mm with an overall thickness of the film laminate of 0.76 mm, for example.

Film laminates according to the invention preferably have an industrially conventional overall thickness, for example, of 0.38, 0.76, and 1.14 mm (that is to say multiples of 0.38 mm).

To produce the film laminates according to the invention, the layers may firstly be produced individually by extrusion and then joined together mechanically, for example by being wound up together on a reel to form the intermediate-layer film according to the invention. It is also possible to produce the film laminates by simultaneous co-extrusion of the layers. For example, co-extrusion may be carried out using an accordingly equipped multi-layer die or a feed block.

In the automotive industry, films are often used which have a "colour strip" in the upper region. To this end, either the upper part of the film can be co-extruded with an accordingly coloured polymer melt, or, in a multi-layer system, one of the layers may be coloured differently. In the present invention, this can be achieved by colouring at least one layer in full or in part.

The film laminates or layers according to the invention are generally produced by extrusion or co-extrusion and are provided under certain conditions (melt pressure, melt temperature and die temperature) with a melt fracture surface, that is to say a stochastic surface roughness.

Alternatively, a film laminate according to the invention already produced can be embossed with a generally non-stochastic roughness by an embossing process between at least one pair of rolls. Embossed films generally exhibit improved deaeration behaviour during safety glass production and are preferably used in the automotive industry. Irrespective of the production method, film laminates according to the invention have a surface structure, applied on one side or more preferably on both sides, with a roughness $R_z$ of 15 to 150 µm, preferably 15 to 100 µm, more preferably 20 to 80 µm, and in particular, an $R_z$ of 40 to 75 µm.

The production and composition of films based on polyvinyl acetals is described in principle, for example, in EP 185 863 B1, EP 1 118 258 B1, WO 02/102591 A1, EP 1 118 258 B1 or EP 387 148 B1.

Film laminates according to the invention are well suited for the production of glass/film laminate/glass, glass/film laminate/plastic composites, or plastic/film laminate/plastic composites. In particular, plastic panes made of polycarbonate, PET or PMMA are used.

The film laminates are particularly suitable for the production of glass/film laminate/glass, glass/film laminate/plastic composites, or plastic/film laminate/plastic composites for motor vehicles, aircraft, ships, architectural glazings, façade components, or for the production of photovoltaic modules.

In particular, the film laminates according to the invention can be used for the production of laminated safety glazings by lamination with one or more glass panes in the manner known to a person skilled in the art. The laminated safety glazings can be used in the automotive industry, for example as windscreens, and in the field of architecture, for example in windows or transparent façade components, or in the manufacture of furniture.

For windscreens with HUD functionality, advantageously at least one of the layers A, B and C is provided with a wedged-shaped cross-section. It is preferred to provide layer B with a wedged-shaped cross-section and layers A and C with a uniform (plan parallel) cross-section.

Measurement Methods

The polyvinyl alcohol content and polyvinyl acetate content of PVB were determined in accordance with ASTM D 1396-92. The degree of acetalisation (=butyral content) can be calculated as the remaining portion from the sum of polyvinyl alcohol content and polyvinyl acetate content determined in accordance with ASTM D 1396-92 needed to make one hundred. Conversion from % by weight into % by mol is achieved by formulas known to a person skilled in the art.

The plasticizer content of the films was established by dissolving the film in ethanol and by subsequent quantitative gas chromatography. In order to establish the plasticizer content of the individual sub-films, the multi-layer films have to be separated again after a conditioning period of approximately one week, that is to say once plasticizer migration has largely stopped, and measured individually.

Measurement of the Damping Behavior

The damping properties of the films were determined by measuring mechanical impedance in accordance with ISO 16940:2008. To this end, the films were laminated between two glass panes 2 mm thick and, from this, a sample measuring 300×25 mm was cut. A cement stud (type UA0866/Brüel&Kjaer) was applied to this glass sample with the aid of a cyanoacrylate adhesive, which made it possible to join the sample directly to an impedance head (type 8001/Brüel&Kjaer GmbH) by means of a thread. This enabled simultaneous measurement of force and acceleration at a point of the glass sample over a frequency range of 1 to 10,000 Hz. The impedance head was located directly on the oscillation table of an oscillation exciter (type 4809/Brüel&Kjaer GmbH), via which the desired forces were transferred. Both are located in a controllable, isolated heating cupboard (Binder), which makes it possible to determine the damping properties over a temperature range of preferably 0 to 40° C. Noise was then produced with the aid of a noise signal generator (PULSE Front-end type 3560B-040/Brüel&Kjaer GmbH), which also acted as a signal receiver. The noise was fed to the oscillation exciter via a power amplifier (type 2718/Brüel&Kjaer GmbH). The frequency ranged from 0 to 5,000 Hz. The response of the glass sample to the generated oscillations was measured at different temperatures, directly via the impedance head, by means of force/acceleration absorption and was evaluated using analysis software (PULSE FFT Analysis type 7770N2/Brüel&Kjaer GmbH). The different natural frequencies f of the oscillation modes n of the glass samples, and the half widths thereof were established from the determined transfer function of force and acceleration. The half width $\Delta f$ was selected at 3 dB below the signal maximum. The expression $\eta = \Delta f/f$ was used to determine the loss factor $\eta$ or damping at the different natural frequencies. A high loss factor or a high damping percentage can be used as a measure for the quality of the soundproofing properties. A damping curve which is as broad as possible in the considered temperature range of 0 to 40° C. is of interest.

Since the damping properties of a material are dependent on temperature, the samples were measured in the selected temperature range at 5° C. intervals, which in principle covers the application range of the sound-absorbing glass.

Measurement of the Tensile Properties of the Films

The values for the tear strengths and elongations at break of the film were determined by means of tensile test machine (TIRA) in accordance with ISO 527 at a rate of 200 mm/min.

EXAMPLES

1) General Synthesis Procedure for Polyvinyl (n)Acetal 100 parts by weight of the polyvinyl alcohol Mowiol 28-99 (commercial product from Kuraray Europe GmbH with a mean degree of polymerisation of 1700) were dissolved in 975 parts by weight of water while heating to 90° C. 57.5 parts by weight of n-butyraldehyde were added at a temperature of 40° C., and 75 parts by weight of 20% hydrochloric acid were added at a temperature of 12° C., while stirring. The mixture was heated to 73° C. after precipitation of the polyvinyl butyral (PVB) and was stirred at this temperature for two hours. After cooling to room temperature, the PVB was separated off, washed neutral with water, and dried. A PVB having a polyvinyl alcohol content of 20.3% by weight and a polyvinyl acetate content of 0.9% by weight was obtained.

2) Synthesis Procedure for Polyvinyl (n)Acetal Having a Polyvinyl Alcohol Content of 14.1% by Weight 100 parts by weight of the polyvinyl alcohol Mowiol 30-92 (commercial product from Kuraray Europe GmbH with a mean degree of polymerisation of 2100) were dissolved in 975 parts by weight of water while heating to 90° C. 56.8 parts by weight of n-butyraldehyde and 0.06 parts by weight of glutardialdehyde were added at a temperature of 40° C., and 100 parts by weight of 20% hydrochloric acid were added at a temperature of 12° C., while stirring. The mixture was heated to 69° C. after precipitation of the polyvinyl butyral (PVB) and was stirred at this temperature for two hours. After cooling to room temperature, the PVB was separated off, washed neutral with water, and dried. A PVB having a polyvinyl alcohol content of 14.1% by weight and a polyvinyl acetate content of 8.8% by weight was obtained.

3) Synthesis Procedure for Polyvinyl (n)Acetal Having a Polyvinyl Alcohol Content of 15.1% by Weight 100 parts by weight of the polyvinyl alcohol Mowiol 30-92 (commercial product from Kuraray Europe GmbH) were dissolved in 975 parts by weight of water while heating to 90° C. 55.5 parts by weight of n-butyraldehyde and 0.06 parts by weight of glutardialdehyde were added at a temperature of 40° C., and 100 parts by weight of 20% hydrochloric acid were added at a temperature of 12° C., while stirring. The mixture was heated to 69° C. after precipitation of the polyvinyl butyral (PVB) and was stirred at this temperature for two hours. After cooling to room temperature, the PVB was separated off, washed neutral with water, and dried. A PVB having a polyvinyl alcohol content of 15.1% by weight and a polyvinyl acetate content of 8.5% by weight was obtained.

4) Synthesis Procedure for Polyvinyl (Iso)Acetal Having a Polyvinyl Alcohol Content of 14.4% by Weight 100 parts by weight of the polyvinyl alcohol Mowiol 30-92 (commercial product from Kuraray Europe GmbH) were dissolved in 975 parts by weight of water while heating to 90° C. 68.6 parts by weight of iso-butyraldehyde and 0.06 parts by weight of glutardialdehyde were added at a temperature of 40° C., and 100 parts by weight of 20% hydrochloric acid were added at a temperature of 12° C., while stirring. The mixture was heated to 69° C. after precipitation of the polyvinyl butyral (PVB) and was stirred at this temperature for two hours. After cooling to room temperature, the PVB was separated off, washed neutral with water, and dried. A PVB having a polyvinyl alcohol content of 14.4% by weight and a polyvinyl acetate content of 8.7% by weight was obtained.

5) Synthesis Procedure for Polyvinyl (Iso)Acetal Having a Polyvinyl Alcohol Content of 15.6% by Weight 100 parts by weight of the polyvinyl alcohol Mowiol 30-92 (commercial product from Kuraray Europe GmbH) were dissolved in 975 parts by weight of water while heating to 90° C. 67.6 parts by weight of iso-butyraldehyde and 0.06 parts by weight of glutardialdehyde were added at a temperature of 40° C., and 100 parts by weight of 20% hydrochloric acid were added at a temperature of 12° C., while stirring. The mixture was heated to 69° C. after precipitation of the polyvinyl butyral (PVB) and was stirred at this temperature for two hours. After cooling to room temperature, the PVB was separated off, washed neutral with water, and dried. A PVB having a polyvinyl alcohol content of 15.6% by weight and a polyvinyl acetate content of 8.6% by weight was obtained.

6) Synthesis Procedure for Polyvinyl (Iso)Acetal Having a Polyvinyl Alcohol Content of 16.4% by Weight 100 parts by weight of the polyvinyl alcohol Mowiol 30-92 (commercial product from Kuraray Europe GmbH) were dissolved in 975 parts by weight of water while heating to 90° C. 66.6 parts by weight of iso-butyraldehyde and 0.06 parts by weight of glutardialdehyde were added at a temperature of 40° C., and 100 parts by weight of 20% hydrochloric acid were added at a temperature of 12° C., while stirring. The mixture was heated to 69° C. after precipitation of the polyvinyl butyral (PVB) and was stirred at this temperature for two hours. After cooling to room temperature, the PVB was separated off, washed neutral with water, and dried. A PVB having a polyvinyl alcohol content of 16.4% by weight and a polyvinyl acetate content of 8.5% by weight was obtained.

7) Synthesis Procedure for Polyvinyl (Iso)Acetal Having a Polyvinyl Alcohol Content of 17.9% by Weight 100 parts by weight of the polyvinyl alcohol Mowiol 30-92 (commercial product from Kuraray Europe GmbH) were dissolved in 975 parts by weight of water while heating to 90° C. 60.8 parts by weight of iso-butyraldehyde and 0.06 parts by weight of glutardialdehyde were added at a temperature of 40° C., and 100 parts by weight of 20% hydrochloric acid were added at a temperature of 12° C., while stirring. The mixture was heated to 69° C. after precipitation of the polyvinyl butyral (PVB) and was stirred at this temperature for two hours. After cooling to room temperature, the PVB was separated off, washed neutral with water, and dried. A PVB having a polyvinyl alcohol content of 17.9% by weight and a polyvinyl acetate content of 8.6% by weight was obtained.

Production of Films

Films formed of sub-films of the composition according to Table 1 were produced by being combined together. 3G8 (triethylene glycol 2-ethylexanoate) was used as a plasticizer.

Examples 1 to 4 show films according to the invention having a polyvinyl(n)butyral/polyvinyl(iso)butyral/polyvinyl(n)butyral structure, in each case with the same polyvinyl alcohol and polyvinyl acetate contents in the outer layers.

Comparative examples 1 and 2 shows films not according to the invention having a polyvinyl(n)butyral/polyvinyl(n)butyral/polyvinyl(n)butyral structure with the given polyvinyl alcohol and polyvinyl acetate contents for the inner layer and outer layers.

Table 2 shows physical data regarding the films. It shows that films according to the invention have better damping at 20° C. than the comparative examples with a comparable PVA content. The PVA content of the polyvinyl acetal used is decisive for the damping behaviour of the film. A film having a high PVA content generally exhibits, with constant P content, poorer damping at a given temperature (in this case 20° C.) than a film having a low PVA content. In examples 3 and 4 however, films according to the invention still exhibit very good damping properties at 20° C., even with high PVA contents. This lies in the fact that, due to improved plasticizer compatibility of films according to the invention, the damping maximum can be shifted towards lower temperatures. A relatively high plasticizer absorption generally means a worsening of mechanical properties, for example tear strengths, of the film. However, it has been found that films according to the invention in examples 1 and 2 have even better tear strengths than comparative examples 1 and 2, with similar PVA content.

TABLE 1

| Example | PVA content of the n-PVB sub-layer A/C [% by weight] | PVA content of the iso-PVB sub-layer B [% by weight] | PVA content of the n-PVB sub-layer B [% by weight] | Layer thickness of sub-layer B [mm] | Layer thickness of sub-layers A + B [mm] | P content of sub-layer A [% by weight] | P content of sub-layer B [% by weight] |
|---|---|---|---|---|---|---|---|
| No. 1 | 20.3 | 14.4 | | 0.2 | 0.8 | 27.5 | 37.5 |
| No. 2 | 20.3 | 15.6 | | 0.2 | 0.8 | 27.5 | 37.5 |
| No. 3 | 20.4 | 16.4 | | 0.2 | 0.8 | 27.5 | 37.5 |
| No. 4 | 20.4 | 17.9 | | 0.2 | 0.8 | 27.5 | 37.5 |
| CE 1 | 20.4 | | 14.1 | 0.2 | 0.8 | 27.5 | 37.5 |
| CE 2 | 20.4 | | 15.1 | 0.2 | 0.8 | 27.5 | 37.5 |

TABLE 2

| Example | 1st mode damping [%] at 20° C. | 1st mode resonance frequency [Hz] at 20° C. | Tear strength [N/mm$^2$] |
|---|---|---|---|
| No.1 | 23.5 | 154 | 21.2 |
| No.2 | 23.4 | 157 | 21.5 |
| No.3 | 20.7 | 164 | 20.9 |
| No.4 | 19 | 172 | 21.5 |
| CE 1 | 13.8 | 178 | 18.2 |
| CE 2 | 12.2 | 182 | 20.9 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A film laminate, comprising at least three layers A, B and C, each containing at least one plasticizer and at least one uncrosslinked polyvinyl acetal, wherein
    two outer layers A and C each comprising at least one identical or different polyvinyl acetal having a proportion of polyvinyl alcohol groups of 18.5 to 23% by weight
    one or more inner layer(s) B comprising a polyvinyl acetal having a proportion of polyvinyl alcohol groups of 12 to 18% by weight, and wherein at least one of the layers A, B or C is a polyvinyl iso-acetal layer,
wherein the film laminate satisfies at least one of the following conditions I and II:
I. said polyvinyl acetal of layer B is polyvinyl iso-butyral and said polyvinyl acetal of layer A or C is polyvinyl n-butyral
II. said polyvinyl acetal of layer B is polyvinyl n-butyral and said polyvinyl acetal of layer A or C is polyvinyl iso-butyral.

2. The film laminate of claim 1, wherein the two outer layers A, C each comprise at least one identical or different polyvinyl iso-acetal and the inner layer(s) B comprise at least one polyvinyl n-acetal.

3. The film laminate of claim 2, wherein the polyvinyl n-acetals are obtained by reacting at least one polyvinyl alcohol with one or more aliphatic, unbranched keto compounds containing 2 to 10 carbon atoms.

4. The film laminate of claim 1, wherein the two outer layers A, C each comprise at least one identical or different polyvinyl n-acetal and an inner layer B comprises at least one polyvinyl iso-acetal.

5. The film laminate of claim 1, wherein the two outer layers A, C each comprise at least one identical or different polyvinyl iso-acetal and an inner layer B comprises at least one polyvinyl iso-acetal which is different from the polyvinyl iso-acetals of layers A and C.

6. The film laminate of claim 1, wherein the polyvinyl iso-acetals are obtained by reacting at least one polyvinyl alcohol with one or more aliphatic keto compounds containing 4 to 10 carbon atoms having at least one branch alpha or beta to the keto group.

7. The film laminate of claim 1, wherein a sample produced with an intermediate-layer film, formed from 2 mm glass/0.8 mm film laminate/2 mm glass in accordance with ISO/PAS 16940 (as of 16.7.2002) has a first mode damping value of more than 19% in the temperature range of 17.5 to 22.5° C.

8. The film laminate of claim 1, wherein the film laminate is produced by co-extrusion of the layers.

9. The film laminate of claim 1, wherein the film laminate is produced by combining the layers.

10. A glass/film laminate/glass composite suitable for use for motor vehicles, aircraft, ships, architectural glazings, façade components, or for the production of photovoltaic modules, wherein the film laminate is a film laminate of claim 1.

11. The film laminate of claim 1, wherein the polyvinyl iso-acetal layer comprises a polyvinyl iso-acetal in which 60 mol percent or more of acetal groups in the polyvinyl iso-acetal are iso-acetal groups, based on the total mols of acetal groups.

12. The film laminate of claim 1, wherein the polyvinyl iso-acetal layer comprises a polyvinyl iso-acetal in which 80 mol percent or more of acetal groups in the polyvinyl iso-acetal are iso-acetal groups, based on the total mols of acetal groups.

13. The film laminate of claim 1, wherein the polyvinyl iso-acetal layer comprises a polyvinyl iso-acetal wherein all acetal groups are iso-acetal groups.

14. The film laminate of claim 1, wherein all polyvinyl acetals have acetate group contents in the range of 0.1 to 3 weight percent based on the weight of the polyvinyl acetal.

15. A film laminate, comprising at least three layers A, B and C, each containing at least one plasticizer and at least one polyvinyl acetal,
two outer layers A and C each comprising at least one identical or different polyvinyl acetal having a proportion of polyvinyl alcohol groups of 18.5 to 23% by weight
one or more inner layer(s) B comprising a polyvinyl acetal having a proportion of polyvinyl alcohol groups of 12 to 18% by weight,
wherein at least one of the layers A, B or C comprises a polyvinyl iso-acetal layer, and
wherein all polyvinyl acetals have acetate group contents in the range of 0.1 to 3 weight percent based on the weight of the polyvinyl acetal wherein the film laminate satisfies at least one of the following conditions I and II:
I. said polyvinyl acetal of layer B is polyvinyl iso-butyral and said polyvinyl acetal of layer A or C is polyvinyl n-butyral
II. said polyvinyl acetal of layer B is polyvinyl n-butyral and said polyvinyl acetal of layer A or C is polyvinyl iso-butyral.

* * * * *